United States Patent
Copeland

(10) Patent No.: US 7,478,786 B2
(45) Date of Patent: Jan. 20, 2009

(54) MECHANICAL ARM WITH SPRING COUNTERBALANCE

(75) Inventor: Stephan Copeland, Marion Station, PA (US)

(73) Assignee: Knoll, Inc., East Greenville, PA (US)

( * ) Notice: Subject to any disclaimer, the term of this patent is extended or adjusted under 35 U.S.C. 154(b) by 1033 days.

(21) Appl. No.: 10/783,793

(22) Filed: Feb. 20, 2004

(65) Prior Publication Data

US 2004/0164213 A1 Aug. 26, 2004

Related U.S. Application Data

(60) Provisional application No. 60/448,786, filed on Feb. 21, 2003.

(51) Int. Cl.
*E04G 3/00* (2006.01)
(52) U.S. Cl. ............................ 248/284.1; 248/280.11
(58) Field of Classification Search ............ 248/284.1, 248/291.1, 292.11, 292.13, 585, 589, 583, 248/629
See application file for complete search history.

(56) References Cited

U.S. PATENT DOCUMENTS

| | | | | |
|---|---|---|---|---|
| 3,820,752 A | * | 6/1974 | Oram | 248/284.1 |
| 4,213,591 A | * | 7/1980 | Jaakkola | 248/281.11 |
| 4,266,747 A | * | 5/1981 | Souder et al. | 248/280.11 |
| 4,447,031 A | * | 5/1984 | Soude et al. | 248/281.11 |
| 4,682,749 A | * | 7/1987 | Strater | 248/284.1 |
| 4,796,162 A | | 1/1989 | Krogsrud | |
| 4,953,822 A | | 9/1990 | Sharber et al. | |
| 4,987,690 A | | 1/1991 | Aaldenberg et al. | |
| 5,008,793 A | | 4/1991 | Copeland | |
| 5,108,061 A | | 4/1992 | Vlasak | |
| 5,477,283 A | * | 12/1995 | Casey | 353/62 |
| 5,538,214 A | * | 7/1996 | Sinila | 248/278.1 |
| 6,064,426 A | * | 5/2000 | Waterman | 362/413 |
| 6,378,829 B1 | * | 4/2002 | Strater et al. | 248/276.1 |
| 6,467,936 B1 | | 10/2002 | Golemba | |
| 6,550,734 B1 | | 4/2003 | Spadea | |
| 6,819,550 B2 | * | 11/2004 | Jobs et al. | 361/683 |
| 7,289,315 B2 | * | 10/2007 | Hillman et al. | 361/683 |
| 2003/0132356 A1 | | 7/2003 | Copeland | |

FOREIGN PATENT DOCUMENTS

| | | |
|---|---|---|
| EP | 0 489 168 | 9/1992 |
| JP | 49-54371 | 8/1972 |

(Continued)

*Primary Examiner*—Anita M King
(74) *Attorney, Agent, or Firm*—Buchanan Ingersoll & Rooney PC

(57) ABSTRACT

A mechanical support arm for holding lamps, flat screen monitors or other equipment which comprises a base member and two links joined by pivoting joints and held in position by friction in the joints. The amount of friction required to hold the equipment in position is reduced by the use of spring-assisted counterbalances that compensate for the majority of the weight. The novel aspects of the invention include the design of the pivots, which are linked rings able to rotate about axles disposed at the pivot points, and the manner in which the springs are attached to the pivot points to reduce the amount of force that need be exerted on the arm to place the object being supported in the desired position.

12 Claims, 8 Drawing Sheets

FOREIGN PATENT DOCUMENTS

| | | |
|---|---|---|
| JP | 54-54478 | 4/1979 |
| JP | 59-34994 | 3/1984 |
| JP | 60-74989 | 5/1985 |
| JP | 60-84017 | 6/1985 |
| JP | 4-57684 | 2/1992 |
| JP | 80-17214 | 1/1996 |

* cited by examiner

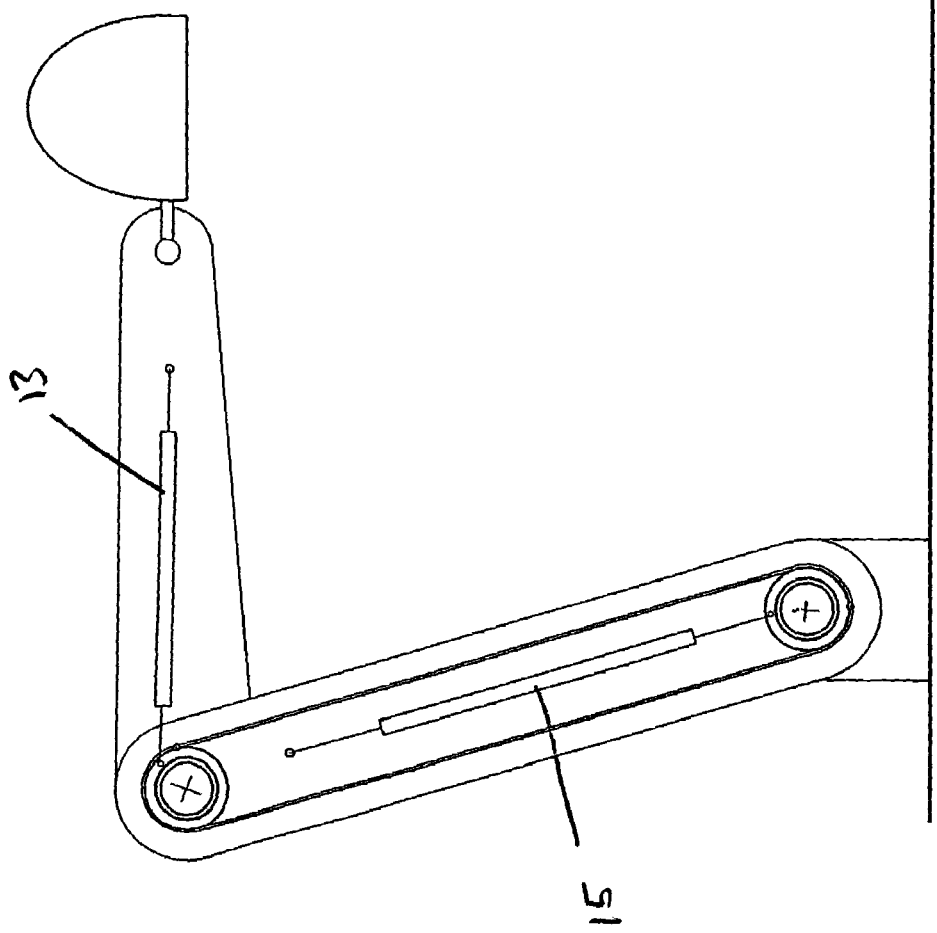

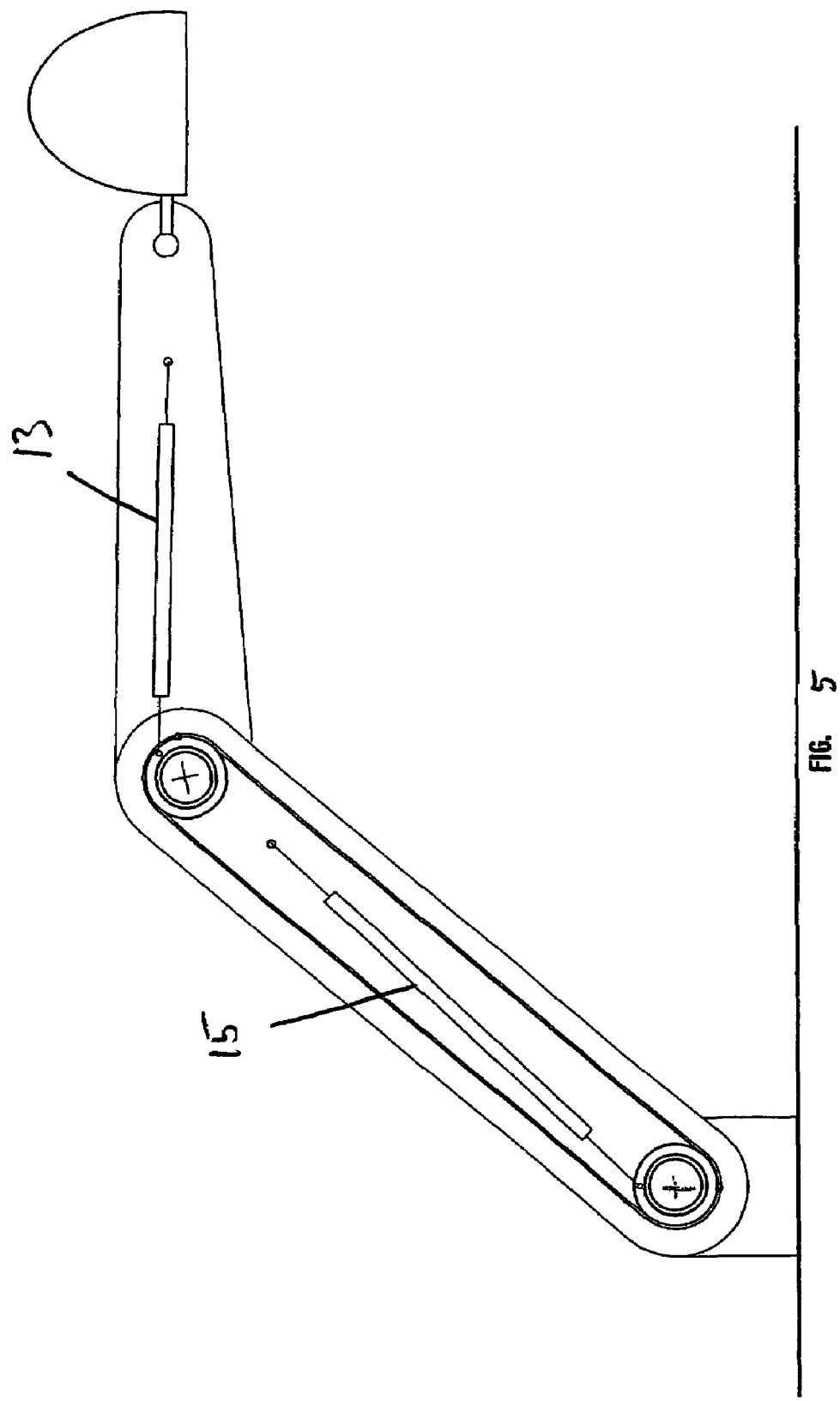

MECHANICAL ARM WITH SPRING COUNTERBALANCE

RELATED APPLICATIONS

This application claims the benefit of U.S. Provisional Application No. 60/448,786, filed Feb. 21, 2003.

FIELD OF THE INVENTION

The invention set forth herein pertains to mechanical arms for holding objects such as lamps, computer screens, laboratory instruments and other items and, in particular, to mechanical arms using springs as mechanical counterbalances to aid in the holding of the weight of the object as the arm is manipulated in different configurations.

BACKGROUND OF THE INVENTION

Adjustable mechanical arms of the type to which this specification pertains are commonly found in offices, laboratories, studios and other locations to support objects such as lamps, computer screens, laboratory instruments, microphones, etc. at a variety of different angles and heights.

Typical prior art lamps of the type commonly available generally consist of an upper and a lower arm pivotally joined at a mid-point. The lower arm may also be pivotally connected to a stationary base. Such arms are typically constructed using a plurality of parallel mechanical linkages for each arm segment that are pivotally joined at various points by parallelogram shaped structures. The typical prior art mechanical arm structure is counterbalanced using a spring which is connected diagonally between one of the parallel linkages and the parallelogram structure at the joint, such that any movement of the arm around the joint will cause an expansion or contraction of the spring to counterbalance the weight of the object being supported at the length of the arm. Arms of this type are illustrated, for example, in U.S. Pat. No. 4,953,822 (Sharber, et al.) and U.S. Pat. No. 6,550,734 (Spadea).

The prior art arms, however, exhibit several unsatisfactory characteristics. First, the arms are somewhat unsightly, having all the mechanical components in plain view, including the linkages, the parallelograms, the springs, the electrical cord and all hardware used to hold the various parts of the arm together. Additionally, the design is often difficult to keep clean as dirt and dust tends to collect in the nooks and crannies of the device, and is expensive to manufacture, both in terms of number of parts and time to assemble.

Therefore, it would be an object of the current invention to provide a design which is more aesthetically appealing than the current prior art designs wherein the mechanical components are hidden inside an enclosure and further wherein the electrical cable is not visible. It would be a further object of the invention that the lamp have no sharp edges or nooks and crannies into which dirt and dust can collect and have fewer part than prior art designs such that manufacturing costs are reduced.

Another problem with designs of the prior art is that the spring counterbalance may not exert a constant force on the object being supported at all positions of the upper and lower arm portions. For example, at the far edges of the range of motion, it is usually the case that insufficient force or an excess of force be exerted on the object being supported, making it difficult and cumbersome to place the object in positions at the extremes of the ranges of motion of either portions of the arm. Additionally, a user of the arm should not be required to use excessive force to move the object being supported to the desired position.

It would therefore also be an object to make the spring pressure more consistent over the entire range of motion of both arms of the device and to minimize the amount of force that must be applied by a user to change the position of the object being supported.

SUMMARY OF THE INVENTION

The mechanical arm described herein provides an arm having two portions, the design of which fulfills the objects of the invention listed above, namely, an arm that is more aesthetically appealing than those of the prior art and wherein the force required by the user to adjust the position of the arm is minimized and the force exerted by the counterbalance springs is more constant over the entire range of motion of both arms of the device.

The mechanical arm is provided with a base, a lower arm connected to the base via a lower, open circular pivot and an upper arm connected to the lower arm via an upper, open circular pivot. The open circular pivots serve both an aesthetic and a functional purpose. First, the open circular pivots replace the typical parallelogram linkage found in most prior art designs and show no points of connection between the arms and the pivots. Therefore, no screws, rivets or other connecting devices are shown at the pivot points. In addition, the circular pivots serve as an axle for an internal ring mechanism which is used to anchor one end of the counterbalancing springs of the lower and upper arms. Preferably, at least one end of each of the springs is anchored via a cable which is wound around the ring. This allows a more constant force to be exerted by the spring regardless of the position of the arm with respect to a horizontal reference and reduces the amount of force required by the user. Furthermore, both arms of the device are constructed of an aesthetically pleasing smooth surface which replaces the parallel linkages of the prior art designs. The smooth surface design eliminates the nooks and crannies of the prior art designs, and therefore makes the arms easier to clean and maintain. Additionally, the internal components of the arms, such as the springs, connecting hardware and electrical cord are hidden within the arms.

BRIEF DESCRIPTION OF THE DRAWINGS

FIG. 4 is a transparent view of the arm showing the lower spring in a relaxed position.

FIG. 5 is a transparent view of the arm showing the lower spring in an expanded position.

DETAILED DESCRIPTION OF THE INVENTION

Figure 1:
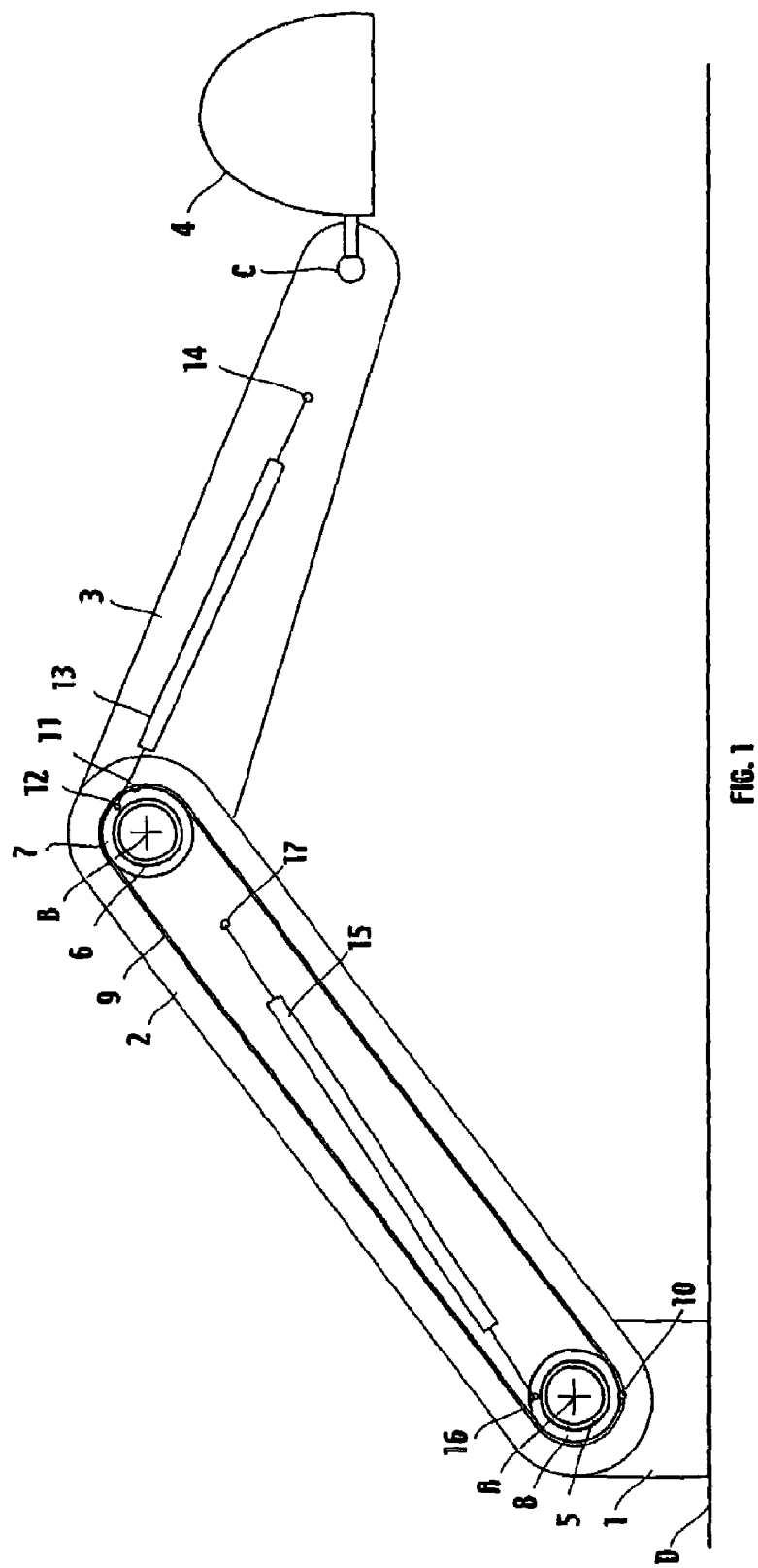
FIG. 1 is a transparent view of the arm of the present invention.
Figure 2:
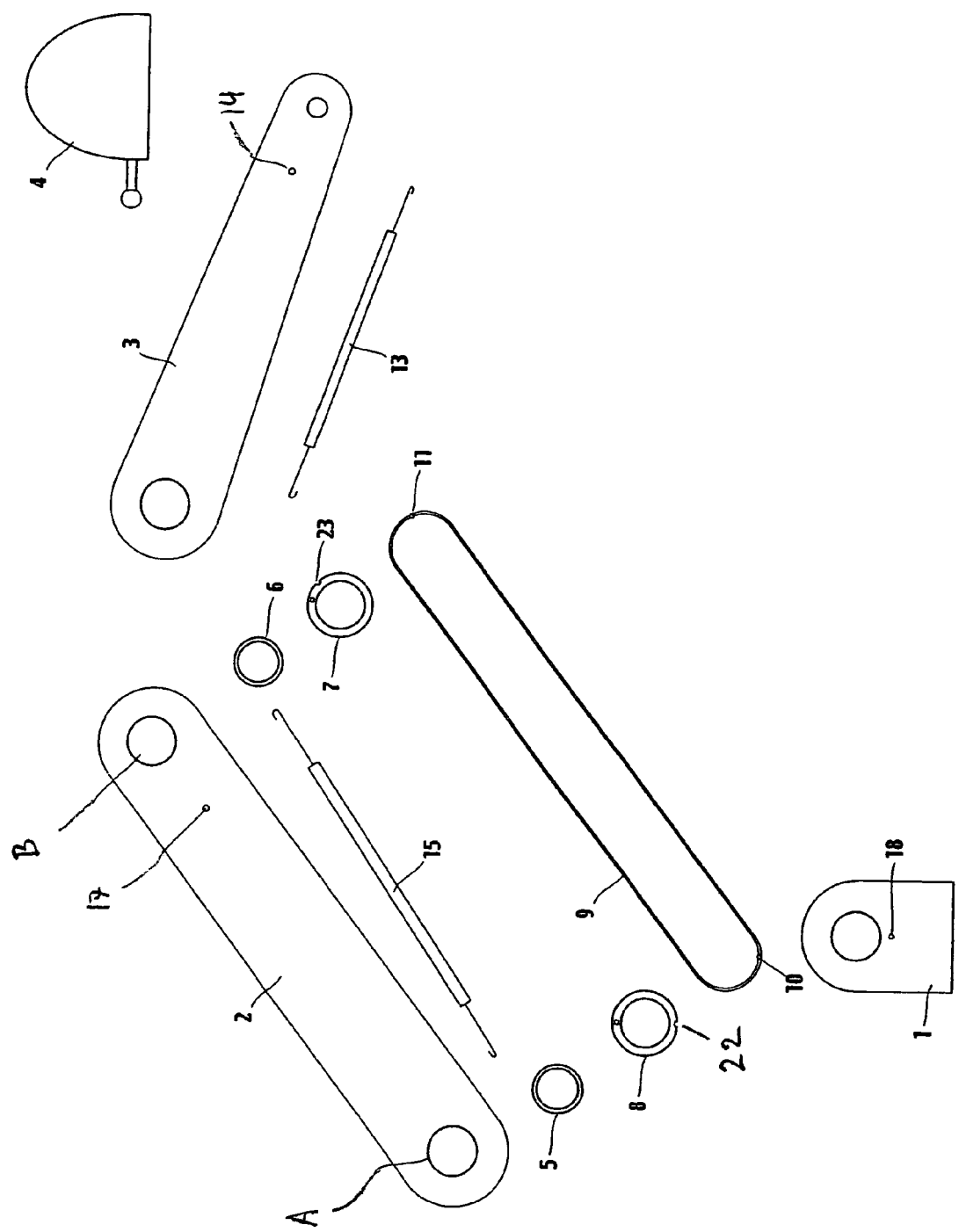
FIG. 2 is an exploded view of the arm of the present invention.

The arm, shown in transparent view in FIG. 1 and in exploded view in FIG. 2, essentially consists of base member 1, lower link 2, upper link 3 and an attachment 4. Base member 1 is attached to a stationary surface D. Base member 1 may comprise a weighted base, a base fitted with a clamp for connection to the edge of a desk or a wall bracket that is permanently attached to a wall. Attachment 4 is shown in FIG. 1 as a lamp, but as discussed previously, can be any object. Attachment 4 is connected to upper link 3 at pivot C. Lower link 2 is connected to base member 1 at pivot point A and upper link 3 is connected to lower link 2 at pivot point B. Pivots points A and B rotate around a horizontal axis.

Pivot points A and B are constructed of hollow axles 5 and 6 respectively, which are very strong because of their large diameter and very light weight because they are hollow. Rings 8 and 7 are disposed around hollow axles 5 and 6 respectively and are connected via cable 9, which is looped around both rings 8 and 7. Ring 8 is fixed in place by pin 10 while ring 7 is allowed to rotate around axle 6 in response to the movement of lower link 2 about pivot point A. The movement of ring 7 is effected by virtue of cable 9 wrapping around and unwrapping from ring 8 as lower link 2 is pivoted about pivot point A, with the result being that the relative position between ring 7 and a horizontal reference is maintained as lower link 2 is moved.

Figure 3A:
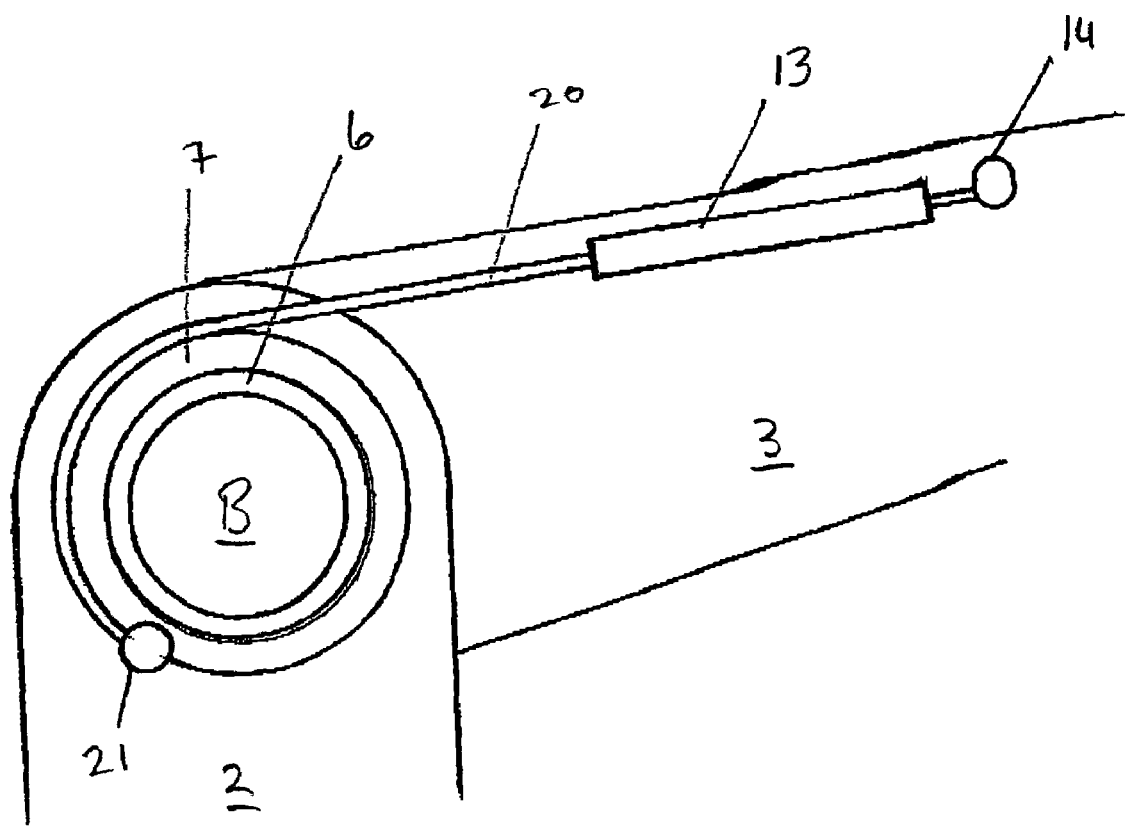
FIGS. 3a and 3b show transparent views of a pivot point of the type described herein showing the preferred method of connecting the spring to the arm.
Figure 3B:
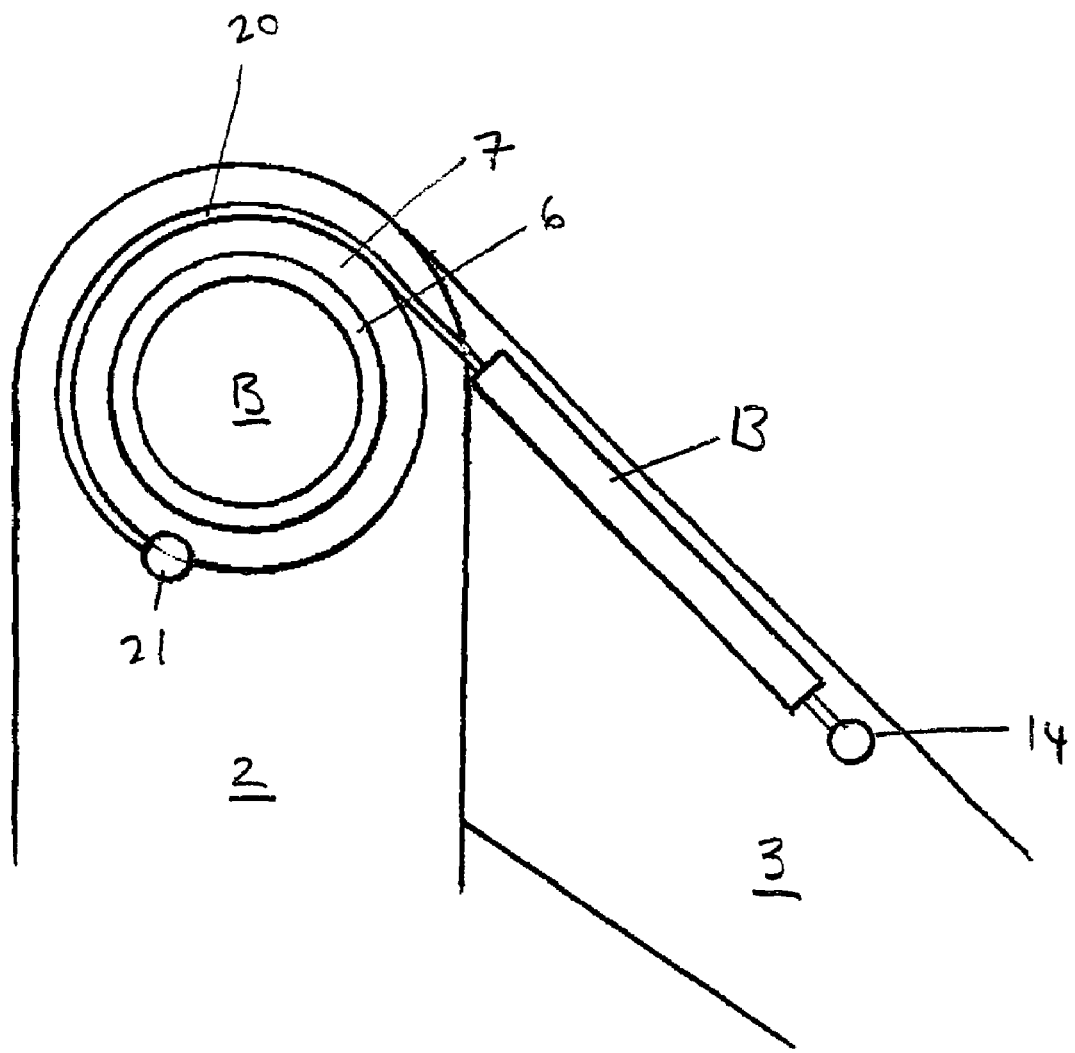

Spring 13 is attached at one end to upper link 3 at anchor point 14. The other end of spring 13 may be attached in one of two ways. In the preferred embodiment, shown in FIGS. 3a and 3b, the other end of spring 13 is attached to cable 20 which is wrapped around ring 7 and attached thereto by pin 21, such that, as upper link 3 is rotated about pivot point B, cable 20 is wrapped around and unwrapped from ring 7. This embodiment provides a more consistent force on attachment 4 over a larger range of movement of upper link 3 about pivot point B. FIG. 3a shows spring 13 in a relaxed state. As arm 3 is rotated clockwise about pivot point B, more of cable 20 is wound around ring 7, and, as a result, spring 13 is caused to be stretched, thereby applying more force to help offset the weight of object 4. Note that, although pivot point B is shown in FIGS. 3a and 3b, the same arrangement also is applicable to pivot point A. Also, cable 9, connecting rings 7 and 8, is not shown in FIGS. 3a and 3b.

In an alternative embodiment, the other end of spring 3, as shown in FIG. 1, may be attached to ring 7 via a hole defined in the outer circumference thereof.

Spring 15 is attached at one end to lower link 2 at anchor point 17 and may be attached to ring 7 in the same manner as spring 13 is attached to ring 8. Note that it is not necessary that springs 13 and 15 be attached to rings 8 and 7 respectively in the same manner. One spring in the design may use the cable method described above, while the other spring may use the hole in the ring method.

Figure 6:
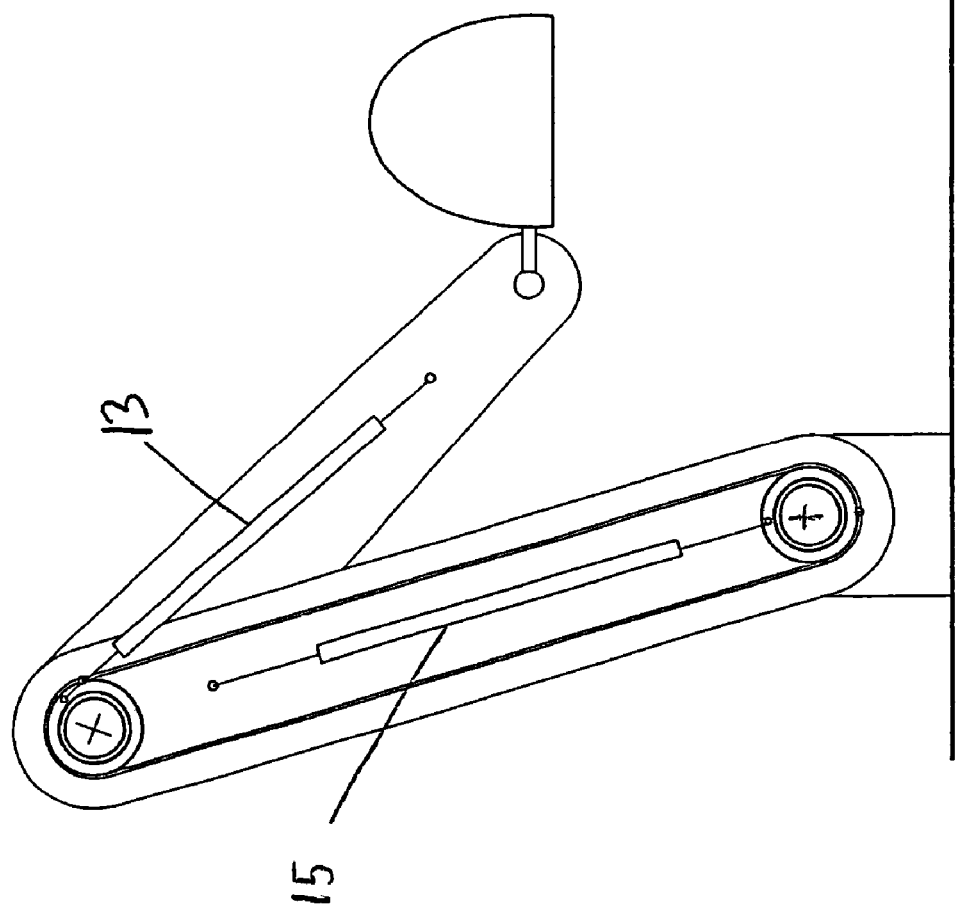
FIG. 6 is a transparent view of the arm showing the upper spring in an expanded position.

Springs 13 and 15 are mounted in a diagonal relationship to pivots points A and B to create a force that has the effect of lifting attachment 4. FIG. 4 shows spring 15 in a low force, relaxed condition, as there is very little cantilever load on pivot point A, while FIG. 5 shows spring 15 in a high force (i.e., expanded) condition, as attachment 4 is moved away from base member 1, thereby increasing the cantilever load on pivot point A. FIG. 4 also shows spring 13 in a low force, relaxed condition, while FIG. 6 shows spring 13 in a high force, expanded condition, helping to lift the weight of attachment 4. A small friction is introduced to pivot axles 5 and 6 to maintain the arm where positioned. Attachment pivot C is held in position with friction alone.

Spring 13 is isolated from the movement of lower link 2 about pivot point A by cable 9 that maintains the base mounting point 12 of spring 13 at the same location relative to the horizontal regardless of where lower link 2 is positioned. Cable 9 is fixed to rings 7 and 8, which rotate around the axles 6 and 5. The lower connection point of cable 9 is fixed to ring 8 as pin 10 engages notch 22 in ring 8, and is also held stationary with respect to base member 1 via pin 10 being inserted in hole 18, defined in base 1. The upper end of cable 9 is fixed to ring 7 by pin 11 that engages notch 23 in ring 7. As lower link 2 is rotated about pivot point A, cable 9 is wound around ring 8, and, as a result, ring 7 is caused to rotate about axle 6 to maintain the relative position of ring 8 with respect to the horizontal reference. This has the effect of not requiring spring 13 to expand or contract as the result of a movement of lower link 2.

Figure 7:
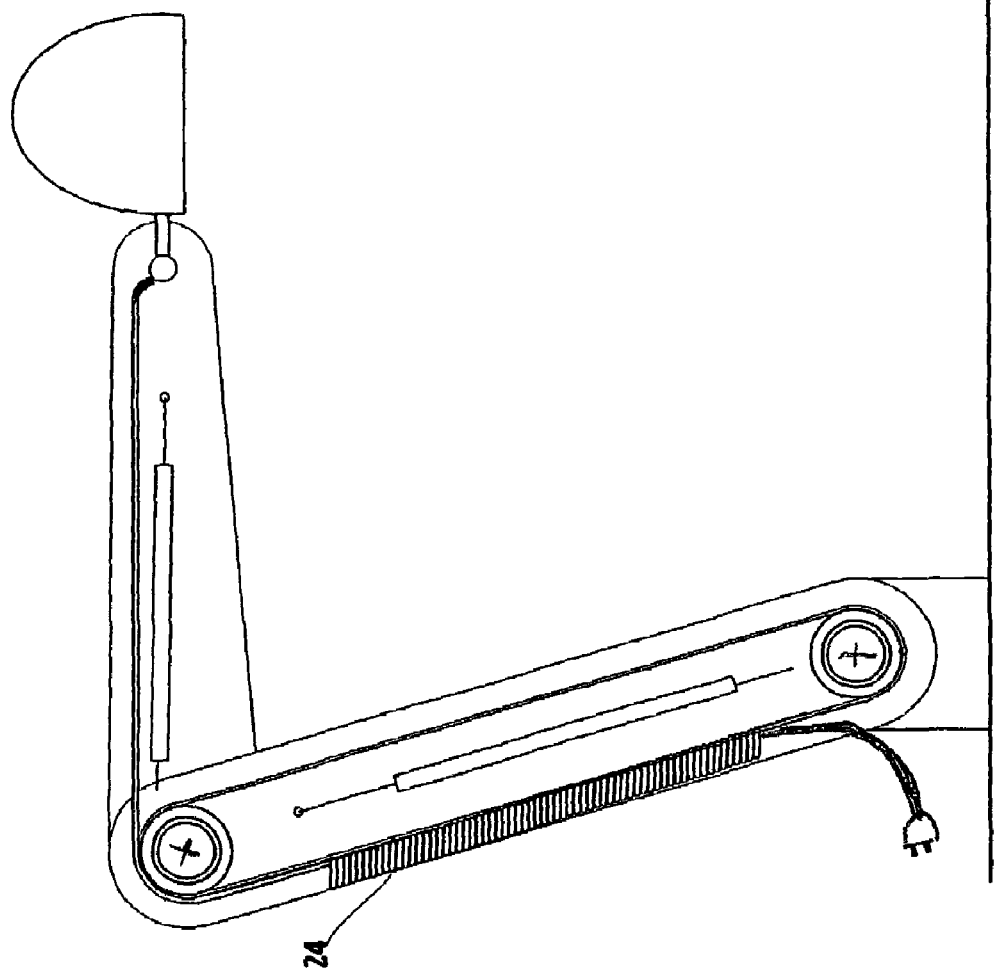
FIG. 7 is a transparent view of the arm showing an electrical cord disposed therein.

FIG. 7 shows electrical cable 24 that is routed through the arm to carry power to attachment 4. A coiled portion of cable 24 is stored in lower link 2, thereby allowing cable 24 to expand and contract as the pivots are rotated. This allows cable 24 to be contained inside the arm without the loose portion of cable typically seen at the pivots of typical prior art mechanical arms.

In a preferred embodiment links 2 and 3, axles 5 and 6 and rings 7 and 8 are made of metal, for example, aluminum, with links 2 and 3 having either a smooth, brushed or painted finish, but may alternatively be constructed of other metals or many other materials, such as plastic. Cables 9 and 20 will typically be a standard steel cable of a type readily available in the prior art.

I claim:

1. A mechanical arm comprising:
   a base;
   a first linkage pivotally attached to said base at a first pivot, said first pivot comprising a first axle;
   a second linkage pivotally attached to said first linkage at a second pivot, said second pivot comprising a second axle;
   a first spring attached between an anchor point defined on said first linkage and said first pivot;
   a second spring attached between an anchor point defined on said second linkage and said second pivot;
   a first ring disposed around said first axle, said first spring attached to said first ring; and a second ring disposed around said second axle, said second spring attached to said second ring.

2. The arm of claim 1 further comprising a cable disposed around said first ring and said second ring such that movement of said first linkage about said first pivot causes said second ring to rotate about said second axle such as to keep a relative position of said second ring with respect to a horizontal plane constant.

3. The arm of claim 2 wherein said first ring is unable to rotate with respect to a horizontal reference.

4. The arm of claim 3 wherein said springs are attached to said pivot points via a hole disposed in said rings.

5. The arm of claim 3 further comprising:
   a first cable attached at a first end to said first spring, a second end of said first cable wrapped around and unmoveably attached to said first ring, said second end of said first cable; and
   a second cable attached at a first end to said second spring, a second end of said second cable wrapped around and unmoveably attached to said second ring, said second end of said second cable opposite said first end of said second cable.

6. The arm of claim 1 wherein said first axle and said second axle are hollow.

7. The arm of claim 3 wherein said base and a first end of said first linkage are rotatably attached to said first axle and further wherein a second end of said first linkage and a first end of said second linkage are rotatably attached to said second axle.

8. The arm of claim 3 wherein said first and said second springs and said first and said second rings are hidden from view within said first and said second linkages.

9. The arm of claim 7 further comprising an apparatus, said apparatus being rotatably attached to a second end of said second linkage.

10. The arm of claim 9 wherein said apparatus is selected from a group consisting of a lamp, a computer monitor, a lab instrument and a microphone.

11. The arm of claim 9 further comprising an electrical cord for providing electrical power to said attachment, said electrical cord being channeled around said second pivot and wherein said electrical cord has a coiled portion disposed in said first linkage, such that movement of said second linkage with respect to said first linkage cause said coiled portion of said electrical cord to expand and contract.

12. The arm of claim 8 wherein said linkages are constructed of a material selected from a group consisting of metal and plastic.

* * * * *